(12) United States Patent
Novotny et al.

(10) Patent No.: US 11,737,475 B2
(45) Date of Patent: Aug. 29, 2023

(54) THERMALLY TREATED COMPOSITION COMPRISING PLANT PROTEINS AND METHODS OF PRODUCTION AND USE THEREOF

(71) Applicant: Société des Produits Nestlé S.A., Vevey (CH)

(72) Inventors: Ondrej Novotny, Cugy (CH); Luca Salvatore Ruffino, Pontarlier (FR); Tomas Davidek, Correvon (CH); Dietmar August Gustav Sievert, St. Sulpice (CH)

(73) Assignee: Societe des Produits Nestle S.A., Vevey (CH)

( * ) Notice: Subject to any disclaimer, the term of this patent is extended or adjusted under 35 U.S.C. 154(b) by 0 days.

(21) Appl. No.: 16/498,925

(22) PCT Filed: Nov. 4, 2018

(86) PCT No.: PCT/IB2018/058646
§ 371 (c)(1),
(2) Date: Sep. 27, 2019

(87) PCT Pub. No.: WO2020/089681
PCT Pub. Date: May 7, 2020

(65) Prior Publication Data
US 2021/0352933 A1 Nov. 18, 2021

(51) Int. Cl.
*A23J 1/14* (2006.01)
*A23J 3/14* (2006.01)
*A23J 3/34* (2006.01)

(52) U.S. Cl.
CPC . *A23J 1/14* (2013.01); *A23J 3/14* (2013.01); *A23J 3/34* (2013.01)

(58) Field of Classification Search
CPC ........ A23J 1/14; A23J 3/14; A23J 3/34; A23L 27/215
(Continued)

(56) References Cited

U.S. PATENT DOCUMENTS

| 3,642,492 A | 2/1972 | Arndt et al. |
| 4,022,919 A | 5/1977 | Comer |

(Continued)

FOREIGN PATENT DOCUMENTS

| EP | 0124165 A2 | 11/1984 |
| EP | 1411778 A2 | 4/2004 |

(Continued)

OTHER PUBLICATIONS

Davidek, T. et al. Food Funct. 4: 1105-1110 (Year: 2013).*

(Continued)

*Primary Examiner* — Hamid R Badr
(74) *Attorney, Agent, or Firm* — K&L Gates LLP

(57) ABSTRACT

Thermally treated compositions are disclosed that include at least one plant protein source. The thermally treated composition may contain a reduced undesirable flavor of the at least one plant protein source and/or an increased desirable flavor exhibiting a distinct flavor note. Also disclosed are heat treated food or beverage products containing the thermally treated composition as well as methods of producing the thermally treated compositions and heat treated food or beverage products and methods of using the thermally treated compositions and heat treated food or beverage products.

19 Claims, 6 Drawing Sheets

(58) Field of Classification Search
USPC .......................................................... 426/44
See application file for complete search history.

(56) References Cited

U.S. PATENT DOCUMENTS

| | | | | |
|---|---|---|---|---|
| 4,752,482 | A | * | 6/1988 | Fulger ........................ A23L 7/25 |
| | | | | 426/18 |
| 5,368,879 | A | * | 11/1994 | White ...................... A23L 27/11 |
| | | | | 426/429 |
| 2004/0191403 | A1 | * | 9/2004 | Hansen ................. A23L 27/215 |
| | | | | 426/660 |
| 2017/0055548 | A1 | | 3/2017 | Chakraborty et al. |

FOREIGN PATENT DOCUMENTS

| | | |
|---|---|---|
| RU | 2445794 C2 | 3/2012 |
| WO | 0249452 A2 | 6/2002 |
| WO | 02100192 A1 | 12/2002 |
| WO | 03070007 A2 | 8/2003 |
| WO | 2009011598 A1 | 1/2009 |
| WO | 2014190418 A1 | 12/2014 |
| WO | 2016015151 A1 | 2/2016 |
| WO | 2016146546 A1 | 9/2016 |
| WO | 2017125518 A1 | 7/2017 |
| WO | 2018050615 A1 | 3/2018 |
| WO | WO-2018109074 A1 * | 6/2018 ........... A23L 27/201 |

OTHER PUBLICATIONS

Roland et al., "Flavor Aspects of Pulse Ingredients", Cereal Chem., vol. 94, Issue No. 1, 2017, pp. 58-65.
Specification for Appl Reference No. 16751-WO-PCT.
Chile Patent Office Communication for Application No. 202100840, dated Feb. 9, 2022, 15 pages.

* cited by examiner

THERMALLY TREATED COMPOSITION COMPRISING PLANT PROTEINS AND METHODS OF PRODUCTION AND USE THEREOF

CROSS REFERENCE TO RELATED APPLICATIONS/INCORPORATION BY REFERENCE STATEMENT

This application is a national stage application filed under 35 USC § 371 of application Ser. No. PCT/IB2018/058646, filed 4 Nov. 2018. The entire contents of the above-referenced patent application is hereby expressly incorporated herein by reference.

STATEMENT REGARDING FEDERALLY SPONSORED RESEARCH OR DEVELOPMENT

Not Applicable.

BACKGROUND

Together with its color and texture, the flavor of a product, comprising the aroma (volatile compounds) and the taste (non-volatile compounds) of a product, has been recognized as one of the main drivers for consumers' food preference.

There is nonetheless a common trend driven by consumer perception to eliminate or replace flavoring ingredients that are artificial or not natural and which are added to the recipes on top of the basic ingredients. Typical flavor characteristics of many foodstuffs are ideally generated directly from recipes' raw materials during thermal processes, such as (but not limited to) roasting, frying, drying, baking, toasting, cooking, extrusion, cereal/fruit bar making, etc., without addition of artificial/non-natural ingredients to the recipe. In all these processes, the Maillard reaction plays a central role in the formation of flavors and color.

For baked cereal-based products, for example, the consumer typically expects to find toasty and/or caramel flavor notes in a product labeled as a "biscuit." Additionally, the visual appearance of a biscuit product should correspondingly be characterized by brown color notes, which are also known to be appreciated by the consumer for such baked cereal-based products.

A common approach to the improvement of organoleptic properties (color and flavor) of cereal-based food products is to increase residence time during cooking and/or the temperature of heat treatment; however, an increase in residence time reduces the throughput and thus is a significant drawback for factory production. More extensive heating also has a negative impact on a nutritional value (e.g. lysine blockage) of the product and can also result in modification of the texture of the product. Thus, there is a need to deliver and/or enhance preferred consumer notes (for example, toasty and/or caramel notes for a biscuit) in baked cereal-based products without the need to add ingredients that are artificial or not natural or which can't be derived directly from the recipe's raw material ingredients while at the same time not introducing significant drawbacks for factory production and/or having a negative impact on the nutritional value (lysine blockage) or texture of the product. There is also a need to have baked cereal-based food products enhanced in preferred consumer flavor notes and having an appropriate visual appearance in terms of color.

Additionally, reduction of sugar (sucrose) in foods is currently a global trend driven by consumer perception worldwide. Sucrose reduction has a significant impact on the flavor of cereal-based products, as it leads among other things to, for example, lower caramel and/or toasty flavor notes in biscuit-type products. Thus, there is also a need to preserve flavor intensity as much as possible in the event of a reduction of sugars so as to maintain consumer preference.

The growing world population demands sustainably produced protein-rich foods. Therefore, products containing plant-based protein sources are a fast growing segment in newer food product development. Pulses and oil crops are attractive sources of protein-rich seeds, which can be used as a starting material for the production of ingredients, such as (but not limited to) flours, protein concentrates, or isolates. These ingredients can be employed in the production of various food products, in particular those where replacement of dairy protein is desired.

Plant-based milk alternatives are a rising trend which can serve as an inexpensive alternative for economically-challenged developing countries as well as in places where the supply of cow's milk is insufficient. Moreover, factors such as (but not limited to) cow's milk allergies, lactose intolerance, calorie concerns, and prevalence of hypercholesterolemia, as well as a growing interest in vegan diets, have influenced consumers towards choosing alternatives to cow's milk. The majority of these milk alternatives, however, lack nutritional balance when compared to bovine milk, but they do contain functionally active components with health promoting properties that are attractive to health conscious consumers.

Flavor is a major factor limiting the use of many vegetable protein ingredients in foods. For example, pulses (i.e., dried edible seeds of certain plants in the legume family) may contain off-flavors such as (but not limited to) beany, fatty, earthy, bitter, astringent, etc. notes that are a barrier to the expansion of pulse ingredients into mainstream food applications.

Many approaches are known to prevent, reduce, or mask off-flavors in plant protein sources. Knowledge available in the scientific literature on off-flavor compounds present in various pulses, their possible origins, and the technologies available to prevent, reduce, or mask these off-flavor compounds were recently reviewed by Roland et al (Cereal Chem. (2017) 94(1):58-65). Cultivar selection and plant breeding together with control of lipid oxidation were described to prevent the formation of off-flavors. Soaking and thermal treatment, pH adjustment, germination, solvent extraction, ultrafiltration, fermentation, and enzymatic treatment are the most common strategies to remove or modify off-flavors in pulses. The use of flavorings to mask plant protein off-flavors was also described, including some hurdles such as binding of flavorings to protein upon heat treatment that leads to decrease of its perception; however, flavorings are negatively perceived by consumers.

Several strategies for improvement of plant protein flavors have been disclosed. For example, WO 2014/190418 and WO 2016/15151 describe production of pulse protein products with reduced astringency that are obtained by fractionation under acidic conditions. U.S. Pat. No. 3,642,492, EP 0124165, and U.S. Pat. No. 4,022,919 describe the use of steam stripping to remove the off-flavors from vegetable protein sources. WO 2017/125518 describes the use of phloretin, a phenolic compound, to reduce astringent and bitter off-tastes of foods or beverages. US 2017/055548 describes a flavor system specially designed for non-animal-derived protein to reduce the off-flavors thereof. WO 02/100192 discloses a method of masking an off-taste by addition of a chlorogenic acid to a soy product.

Milk powders are used during roller-drying of cereals in order to generate characteristic biscuit flavors and as a technological aid to improve film formation. The latter seems to be partially due to proteins, and a similar effect is also observed with, for example, soy flour.

Several patents, for example EP1411778 and WO 2016/146546 describe the use of dairy proteins for the preparation of several flavoring compositions and their use in multiple product categories. On the other hand, preparation of flavor concentrates from plant proteins is seldom if ever published.

Dairy and plant protein rich ingredients are two completely different raw materials, and replacement of one of these types of protein ingredients with the other results in several challenges from operational, product performance, and consumer acceptance standpoints.

Therefore, there is a need in the art for new and improved food products that contain plant-based protein and methods of producing same that overcome the disadvantages and defects of the prior art. It is to such products, as well as methods of producing and using same, that the present disclosure is directed.

BRIEF DESCRIPTION OF THE FIGURES

Additional features and advantages of the present disclosure are described in, and will be apparent from, the description of the particular (but non-limiting) embodiments which are set out below with reference to the Drawings.

DETAILED DESCRIPTION

Figure 1:
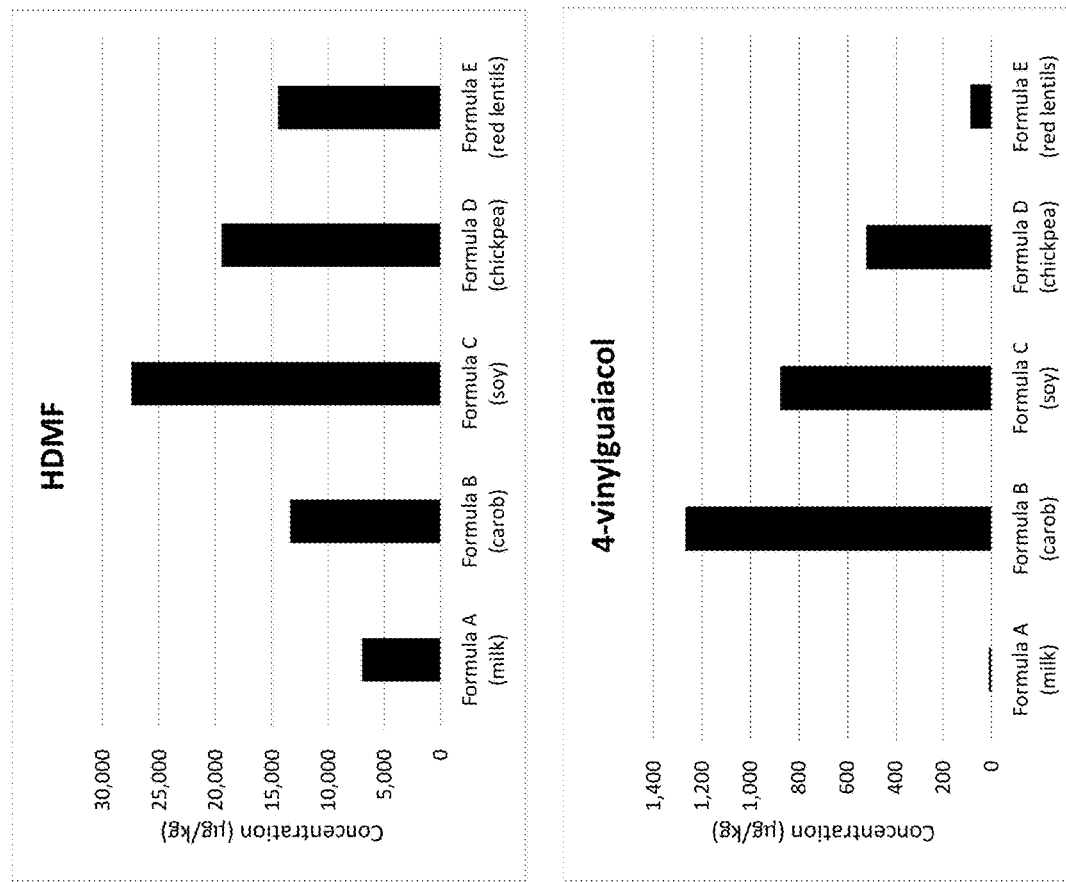
FIG. 1 contains graphical representations of the concentrations of HDMF (4-hydroxy-2,5-dimethyl-3(2H)-furanone; upper panel) and 4-vinylguaiacol (lower panel) in thermally treated compositions produced in accordance with the present disclosure.

Before explaining at least one non-limiting embodiment of the method in detail by way of exemplary language and results, it is to be understood that the present disclosure is not limited in its application to the details of construction and the arrangement of the components set forth in the following description. The present disclosure is capable of other embodiments or of being practiced or carried out in various ways. As such, the language used herein is intended to be given the broadest possible scope and meaning, and the embodiments are meant to be exemplary—not exhaustive. Also, it is to be understood that the phraseology and terminology employed herein is for the purpose of description only and should not be regarded as limiting.

Unless otherwise defined herein, mechanical and technical terms used in connection with the present disclosure shall have the meanings that are commonly understood by those of ordinary skill in the art. Further, unless otherwise required by context, singular terms shall include pluralities, and plural terms shall include the singular. The foregoing products and methods are generally produced and performed according to conventional methods well known in the art and as described in various general and more specific references that are cited and discussed throughout the present specification.

All patents, published patent applications, and non-patent publications mentioned throughout the specification are indicative of the level of skill of those skilled in the art to which this present disclosure pertains. All patents, published patent applications, and non-patent publications referenced in any portion of this application are herein expressly incorporated by reference in their entirety to the same extent as if each individual patent or publication was specifically and individually indicated to be incorporated by reference.

All of the compositions, products, and/or methods disclosed herein can be made and executed without undue experimentation in light of the present disclosure. While the compositions, products, and methods of the present disclosure have been described in terms of particular embodiments, it will be apparent to those of skill in the art that variations may be applied to the compositions, products, and/or methods and in the steps or in the sequence of steps of the methods described herein without departing from the concept, spirit, and scope of the present disclosure. All such similar substitutions and modifications apparent to those skilled in the art are deemed to be within the spirit, scope, and concept of the present disclosure as defined by the appended claims.

As utilized in accordance with the present disclosure, the following terms, unless otherwise indicated, shall be understood to have the following meanings:

The use of the term "a" or "an" when used in conjunction with the term "comprising" in the claims and/or the specification may mean "one," but it is also consistent with the meaning of "one or more," "at least one," and "one or more than one." As such, the terms "a," "an," and "the" include plural referents unless the context clearly indicates otherwise. Thus, for example, reference to "a compound" may refer to one or more compounds, two or more compounds, three or more compounds, four or more compounds, or greater numbers of compounds. The term "plurality" refers to "two or more."

The use of the term "at least one" will be understood to include one as well as any quantity more than one, including but not limited to, 2, 3, 4, 5, 10, 15, 20, 30, 40, 50, 100, etc. The term "at least one" may extend up to 100 or 1000 or more, depending on the term to which it is attached; in addition, the quantities of 100/1000 are not to be considered limiting, as higher limits may also produce satisfactory results. In addition, the use of the term "at least one of X, Y, and Z" will be understood to include X alone, Y alone, and Z alone, as well as any combination of X, Y, and Z. The use of ordinal number terminology (i.e., "first," "second," "third," "fourth," etc.) is solely for the purpose of differentiating between two or more items and is not meant to imply any sequence or order or importance to one item over another or any order of addition, for example.

The use of the term "or" in the claims is used to mean an inclusive "and/or" unless explicitly indicated to refer to alternatives only or unless the alternatives are mutually exclusive, although the disclosure also supports a definition that refers to only alternatives and "and/or." For example, a condition "A or B" is satisfied by any of the following: A is true (or present) and B is false (or not present), A is false (or not present) and B is true (or present), and both A and B are true (or present).

As used herein, any reference to "one embodiment," "an embodiment," "some embodiments," "one example," "for example," or "an example" means that a particular element, feature, structure, or characteristic described in connection with the embodiment is included in at least one non-limiting embodiment. The appearance of the phrase "in some embodiments" or "one example" in various places in the specification is not necessarily all referring to the same embodiment, for example. Further, all references to one or more embodiments or examples are to be construed as non-limiting to the claims.

Throughout this application, the term "about" is used to indicate that a value includes the inherent variation of error for an apparatus/composition/product/device/kit, the method being employed to determine the value, or the variation that exists among the study subjects. For example, but not by way of limitation, when the term "about" is utilized, the designated value may vary by plus or minus twenty percent, or fifteen percent, or twelve percent, or eleven percent, or ten percent, or nine percent, or eight percent, or seven percent, or six percent, or five percent, or four percent, or three percent, or two percent, or one percent from the specified value, as such variations are appropriate to perform the disclosed methods and as understood by persons having ordinary skill in the art. The term "about" can also be understood to refer to numbers in a range of numerals. Moreover, all numerical ranges herein should be understood to include all integers, whole or fractions, within the range.

As used in this specification and claim(s), the words "comprising" (and any form of comprising, such as "comprise" and "comprises"), "having" (and any form of having, such as "have" and "has"), "including" (and any form of including, such as "includes" and "include"), or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

As used herein, the term "substantially" means that the subsequently described event or circumstance completely occurs or that the subsequently described event or circumstance occurs to a great extent or degree. For example, when associated with a particular event or circumstance, the term "substantially" means that the subsequently described event or circumstance occurs at least 80% of the time, or at least 85% of the time, or at least 90% of the time, or at least 95% of the time. For example, the term "substantially adjacent" may mean that two items are 100% adjacent to one another, or that the two items are within close proximity to one another but not 100% adjacent to one another, or that a portion of one of the two items is not 100% adjacent to the other item but is within close proximity to the other item.

As used herein, the term "added" is understood to refer to an element that is introduced into a composition and not to the element as it may naturally inherently exist in a composition.

When the content of one ingredient is expressed as or "w/w," this expression indicates weight percentage (the ratio or percentage of one substance out of the total) of the ingredient in the composition. When the content of one ingredient is expressed as "w/w dry matter" or "dry w/w," these expressions indicate dry weight percentage (the ratio or percentage of one substance out of the total) of the ingredient in the dry composition.

The term "concentration ratio" as used herein will be understood to indicate a ratio between concentrations of odorants measured in the same sample of heat treated product.

The term "concentration factor" as used herein will be understood to indicate a ratio between concentrations of a single odorant (or other substance) measured in two different samples.

The term "heat treated food product," "heat treated beverage product," heat treated food or beverage product," or "heat treated product" as used herein refers to edible products which are obtained via heat treatments of food or beverage preparation as below defined and which may be consumed directly or may be used as an ingredient for further processing to prepare an edible or potable product.

The term "heat treatment" as used herein refers to a processing step wherein a food or beverage preparation as below defined can be microbiologically, physically, and/or chemically modified as an effect of application of high temperature for a given time. Non limiting examples of heat treating techniques include: oven baking, wafer baking, puffing, roller drying, extrusion, toasting, cooking, roasting, spray drying, and/or frying. Typically, the temperatures for heat treatments range from about 70° C. to about 270° C.

The term "heat treated cereal-based food product," "heat treated cereal-based beverage product," "heat treated food or beverage product," or "heat treated cereal-based product" as used herein refers to heat treated products as above defined which are obtained via heat treatment of a food preparation comprising at least a cereal-based ingredient. Non limiting examples of heat treated cereal-based food products include: biscuits, wafers, breakfast cereals, powdered cereal products meant to be reconstituted in porridges, paps and/or beverages, bread, ice-cream cones, pizza, bread sticks, bread replacers, bakery products, cakes, muffins, pasta, and the like.

Another non-limiting example of a "heat treated cereal-based food product" is an "infant cereal product." The term "infant cereal product" as used herein relates to a powdered instant cereal product that has been designed specifically for infants in order to provide the required nutritional contribution to the infant.

The term "powdered beverage" as used herein relates to a specially formulated powdered beverage that has been designed for infants or toddlers or growing children in order to provide the required nutritional contribution for every stage of development. The drink for consumption is prepared after reconstitution of the powder in water or other liquid. Non-limiting examples of powdered beverages utilized in accordance with the present disclosure include infant formulas and Growing Up Milks (GUMs). GUMs are milk-based drinks with added vitamins, minerals, and/or protein intended for children such as (but not limited to) aged 12-36 months. One particular (but non-limiting) example of GUMs include NIDO® powdered milk beverages (Nestlé SA, Vevey, Switzerland), which are specially formulated powdered milk beverages for toddlers and growing children at each developmental stage and which contain essential vitamins and minerals (such as, but not limited to, calcium, zinc, iron, vitamin A, vitamin C, and/or vitamin D) and may further contain protein. Another particular (but non-limiting) example of powdered beverages utilized in accordance with the present disclosure include NAN® infant formulas and GUMs (Nestlé SA, Vevey, Switzerland).

The term "food or beverage preparation" as used herein refers to a mixture of ingredients which is meant to deliver a "heat treated food or beverage product" after being subjected to heat treatment. Non-limiting examples of food or beverage preparations include: batters; doughs; slurries; soups; mixtures comprising cereal-based ingredients; mixtures comprising plant-based proteins; mixtures comprising cereals and flour; mixtures comprising sugar and flour; mixtures comprising flour, fats, and sugar; mixtures comprising one or more pulse ingredients; and the like.

The term "cereal-based ingredient" or "cereal ingredient" as used herein refers to an ingredient derived from cereals. Non limiting examples of cereal-based ingredients include: flour; starch; hydrolyzed starch such as (but not limited to) maltodextrin; gluten; cereal fibers; bran; germ; hull; and mixtures thereof. Non-limiting examples of cereals from which cereal-based ingredients may be derived include: wheat, oat, corn, rice, sorghum, spelt, barley, buckwheat, bulgur, millet, amaranth, quinoa, rye, teff, triticale, and the like.

The term "cereal flour" as used herein refers to a cereal-based ingredient as above defined which may be refined or whole grain flour and which may derive from (for example but not by way of limitation) wheat, oat, corn, rice, sorghum, spelt, barley, buckwheat, bulgur, millet, amaranth, quinoa, rye, teff, or triticale, as well as any mixtures thereof.

The term "cereal-based food or beverage preparation" or "cereal-based food or beverage product" as used herein refers to a food or beverage preparation/food or beverage product as above defined which comprises at least one cereal-based ingredient.

The terms "fat," "fat source," "lipid," "lipid source," "fats," "oil," or "oils" as used herein indicate an edible solid fat, an edible liquid fat, or a mixture thereof. Non-limiting examples of fat categories are those from animal, fish, or vegetable origins. Non-limiting examples of fats which could be used in accordance with the present disclosure include: fish oil, cocoa butter, cocoa butter equivalents (CBE), cocoa butter substitutes (CBS), vegetable oils (for example rapeseed oil, palm oil, corn oil, soy oil, corn oil, coconut oil and/or sunflower oil), milk fat, butter fat, and butter oils, amongst others.

The term "bulking agent" as used herein refers to an ingredient which increases food or beverage volume or weight, for example increases total solid content. Non-limiting examples of bulking agents include: sucrose, maltodextrins, enzymatically hydrolyzed cereal flour, cereal bran, soluble fibers like guar gum and psyllium husk, Carnuba Wax, Glycerin, Beta Glucan, Mannitol, Maltitol, Polydextrose, Methylcellulose, and Pectin, as well as any mixtures thereof.

The term "acidity regulator" as used herein refers to a substance which, when dissolved in a water-based composition, is able to modulate the pH of such composition. Non-limiting examples of acidity regulators include: monosodium dihydrogen-, disodium hydrogen-, and tri-sodium phosphate; monopotassium dihydrogen-, dipotassium hydrogen-, and tri-potassium phosphate; magnesium phosphate; sodium carbonate; sodium bicarbonate; potassium carbonate; potassium bicarbonate; sodium hydroxide; potassium hydroxide; and pyrophosphate salts; as well as any mixtures thereof.

The term "sugar" or "sugars" as used herein includes available monosaccharides (such as, but not limited to, galactose, fructose, and glucose), available disaccharides (such as, but not limited to, sucrose, lactose, and maltose), or mixtures thereof.

The term "reducing sugar" as used herein refers to any sugar that is capable of acting as a reducing agent because it has a free aldehyde group or a free ketone group or is capable of forming such a group in solution through isomerization. Non-limiting examples of reducing sugars include: fructose, glucose, xylose, tagatose, rhamnose, maltose, lactose, fucose, arabinose, and galactose, as well as any mixtures thereof.

As it will be apparent to the person skilled in the art, the total amount of sugar or reducing sugar in the thermally treated compositions or heat treated food or beverage products of the present disclosure may be provided by different ingredients present in the recipe. For example, sugar and/or reducing sugars may be comprised in or provided by the plant-based protein ingredient, the bulking agent, or the cereal base ingredient, or the sugar and/or reducing sugar may be added as pure ingredients to the composition/product.

The term "caramel ingredient" as used herein refers to an artificial ingredient which may be added to food or beverage products to increase certain flavor notes and/or color. The caramel ingredient is typically prepared by melting sugar or by heating sugar syrup at temperatures between about 110° C. to about 180° C., optionally in the presence of acidic and/or alkaline catalysts.

The term "buffering agent" as used herein refers to a substance (such as, but not limited to, a weak acid or base) used to control and/or maintain pH, protect proteins from heat coagulation, and/or facilitate dispersion of ingredients. Non-limiting examples of substances that can act as buffering agents in accordance with the present disclosure include monophosphates, diphosphates, sodium mono- and bicarbonates, potassium mono- and bicarbonates, or a combination thereof. Particular non-limiting examples are salts such as potassium phosphate, dipotassium hydrogen phosphate, potassium dihydrogen phosphate, sodium bicarbonate, sodium citrate, sodium phosphate, disodium hydrogen phosphate, sodium dihydrogen phosphate, and sodium tripolyphosphate.

The term "thermally treated composition" as used herein refers to the pre-reacted (heated) portion of ingredients comprising (for example, but not by way of limitation) plant-based protein ingredient(s), water, bulking agent(s), reducing sugar(s), buffering agent(s), and/or fat(s) which is obtainable from one step of the process disclosed herein and which may be reintroduced in the food or beverage preparation before subjecting it to heat treatment to produce the heat treated food or beverage product (such as, but not limited to, a cereal-based food product or powdered beverage).

Where amounts of certain ingredients (such as, for example (but not by way of limitation), sugars, fats, etc.), are indicated which may result from different constituents incorporated in the recipe, then such amounts will reflect the total content of that ingredient in the composition, irrespective of the component it is derived from.

The term "flavor" and "flavors" as used herein refers to the aroma (volatile compounds) and the taste (non-volatile compounds) which are comprised in a food or beverage product. Such flavor can be detected or assessed by different means, including for example (but not by way of limitation) sensory and analytical means. In one embodiment, the flavor generated according to the present disclosure is delivered by volatile compounds.

The term "flavor precursors" as used herein refers to species or ingredients comprising them which are capable of producing flavor by breaking down (for example under caramelization process) or reacting with other components (for example in Maillard reaction) during thermal food processing. Such flavor precursors do not necessarily have flavoring properties themselves.

The term "caramelization" as used herein will have the meaning usually assigned to it in the state of the art; the term defines the thermal reaction of sugars per se, producing the characteristic caramel flavor and brown color. Optionally, various ingredients (acidic and/or alkaline catalysts) can be used during the caramelization process in order to facilitate sugar degradation and direct the process more towards aroma formation or towards brown pigment accumulation.

The terms "Maillard reaction" and "Maillard reactants/products" as used herein will have the meaning usually assigned to them in the state of the art; the terms define the complex series of chemical reactions between carbonyl and amino components derived from biological systems, present in food matrixes or in food additives (e.g. ammonium salts) and the associated reactants and products, respectively. The term "Maillard reaction" is used herein in the established broad sense to refer to these reactions, and includes the closely associated reactions which are usually coupled with the Maillard reaction sensu stricto (such as Strecker degradation).

The term "plant-based protein ingredient" or "plant protein source" as used herein will be understood to refer to an ingredient of plant origin that can serve as a dietary source of protein. Plant protein sources belong to the family of legumes. These ingredient are derived from (for example, but not by way of limitation) pulses or oil seeds, which are used as a starting material for the production of (for example, but not by way of limitation) flours, protein concentrates, or isolates.

The term "pulse" as used herein will be understood to refer to dried edible seeds of certain plants in the legume family. Pulses are high in dietary fiber, high in protein, rich in micronutrients, and low in fat. Examples of pulses include, but are not limited to: chickpeas; lentils; dry beans (such as, but not limited to, carob, kidney, haricot, lima, butter, adzuki, mungo, golden, green gram, black gram, urd, scarlet runner, rice, moth, and tepary beans); faba beans; dry broad beans; dry peas; dry cow peas; pigeon peas; Bambara beans; vetches; lupins; and pulses nes (such as, but not limited to, lablab or hyacinth beans, jack or sword beans, winged beans, guar beans, velvet beans, and yam beans); and any mixtures or combinations thereof. Pulses can be processed into pulse flours, pulse semolinas, and pulse brans and/or separated into pulse proteins, pulse fibers, and pulse starches.

The term "oil seed" as used herein will be understood to refer to seeds of certain plants that are industrially utilized to obtain vegetable oils. Non-limiting examples of oil seeds include soybeans, peanuts, sunflower seeds, canola seeds, rapeseed, sesame seeds, golden linseed, almond, hemp seed, pumpkin seed, grapeseed, combinations thereof, and the like.

The term "flour from oil seeds" as used herein refers to ground by-products obtained from oil seeds after pressing oil out. The flours from oil seeds are high in dietary fiber and high in protein.

The term "shelf-stable" as used herein refers to the ability of a food or beverage product to be safely stored and sold in a sealed container at ambient or room temperature while still having a useful shelf life in which the taste, texture, and nutritional aspects (i.e., nutritional integrity, nutritional potency, etc.) of the product is retained. Examples of periods considered to be a "useful shelf life" include, but are not limited to, at least about two months, at least about three months, at least about four months, at least about five months, at least about six months, at least about twelve months, and longer.

The term "ppb" as used herein will be understood to stand for "parts per billion." In addition, the terms "ppb" and "µg/kg" are used interchangeably herein.

Turning now to the methods of the present disclosure, these methods provide, for the first time, thermally treated compositions and heat treated food or beverage products, as well as methods of producing and using same, that overcome (at a minimum) one or more of the following defects and disadvantages of the prior art:
  (1) the need to decrease line throughput in order to enhance organoleptic properties (flavor and color) of food or beverage products (that is, flavor/color generation may be performed to the detriment of line throughput);
  (2) low yields of flavor active molecules due to high dilution of flavor precursors and suboptimal processing conditions;
  (3) modification of other product attributes such as texture and appearance caused by modulation of flavor of thermally treated foods and beverages;
  (4) a decrease in the level of desirable compounds (nutrients such as, but not limited to, reactive lysine) during modulation or enhancement of flavor of food and beverage products;
  (5) a decrease in flavor intensity and consequently consumer preference after sugar reduction;
  (6) off-flavor of vegetable protein ingredients (a major factor limiting their use in foods and beverages); and
  (7) negative consumer perception of flavoring ingredients (that might potentially be used to mask off-flavors of plant protein sources or to improve flavor after sugar reduction) and a consumer desire for 'natural,' 'clean label,' and 'kitchen cupboard ingredients.'

The present disclosure relates to a process where a portion of the ingredients is thermally treated (pre-reacted) prior to the main processing step used in producing a food or beverage product, in order to improve the organoleptic properties of the finished food or beverage product. The process involves a smart splitting of the recipe into bulk ingredients and ingredients rich in flavor precursors. The precursor-rich ingredients (part or all) are thermally treated (such as, but not limited to, using a heat exchanger) prior to the resulting heat treated mixture being blended with the bulk ingredients, and the mixture thereof being processed via the main processing step(s) (such as, but not limited to, roller-drying, extrusion, baking, spray-drying, cereal/fruit bar making, etc.). Both pre-reaction and main processing steps can be run simultaneously so that the whole process remains continuous.

The process of the present disclosure results in an improvement in organoleptic properties of the food or beverage product without decreasing line throughput and/or compromising on nutritional aspects of the food or beverage product. For example, the process results in an attenuation of off-flavor of plant proteins, as these are often a barrier to the expansion of the use of these ingredients in food and beverage applications. The process also results in operational benefits, such as (but not limited to) the use of mono-cylinder roller dryers (which are preferred by operations but less suitable for flavor generation) instead of bi-cylinders (which have a lower throughput but better flavor generation ability). In addition, the process disclosed herein represents a technology building block (industrial solution) to support sugar reduction while meeting consumer desire for 'natural,' 'clean label,' and 'kitchen cupboard ingredients.' Also, the process provides an improvement in quality standards by enabling improvement in organoleptic properties without decreasing nutritional value (such as, but not limited to, reactive lysine).

In addition, the processes described herein can be applied across a broad range of food and beverage applications.

Certain non-limiting embodiments of the present disclosure are directed to a method of preparing a preparing a thermally treated composition. The method includes at least the steps of: (a) forming a slurry comprising at least one plant protein source, at least one bulking agent, at least one reducing sugar source, at least one fat source, at least one buffering agent, and water; and (b) subjecting the slurry to a heat treatment at a temperature in a range of from about 100° C. to about 150° C. under a pressure in a range of from about 2 bars to about 7 bars for a period of time in a range of from about 5 minutes to about 20 minutes to produce the thermally treated composition.

The thermally treated composition possesses one or more desirable characteristics that are not present in a composition produced without the heat treatment step (b) above. For example, the heat treated food or beverage product may have at least one increased desirable flavor exhibiting a distinct flavor note when compared to a food or beverage product produced in the absence of step (b). For example (but not by way of limitation), the distinct flavor note may be selected from the group consisting of caramel, toffee, cookie, toasty, and sweet. Alternatively (and/or in addition thereto), Alternatively (and/or in addition thereto), the thermally treated composition has at least one reduced undesirable flavor of the at least one plant protein source when compared to a food or beverage product produced in the absence of step (b). For example (but not by way of limitation), the undesirable flavor may be selected from the group consisting of beany, green, earthy, hay-like, fishy, metallic, fatty, rancid, bitter, and astringent.

The thermally treated composition produced in accordance with the methods of the present disclosure is provided with a unique aroma fingerprint due to the presence of increased levels of desirable flavors and/or decreased levels of undesirable flavors. One non-limiting example of an aroma fingerprint may comprise: 2,3-butanedione present at a concentration of at least about 500 ppb; HDMF present at a concentration of at least about 8,000 ppb; and no more than about 500 ppb hexanal. This fingerprint may further include (for example, but not by way of limitation) maltol present at a concentration of at least about 1500 ppb. Another non-limiting example of an aroma fingerprint may comprise: 2,3-butanedione present at a concentration of at least about 400 ppb; HDMF present at a concentration of at least about 8,000 ppb; and no more than about 1000 ppb hexanal; and may further include (for example, but not by way of limitation) maltol present at a concentration of at least about 1000 ppb. Another non-limiting example of an aroma fingerprint may comprise one or more of the following: 2,3-butanedione present at a concentration of at least about 1000 ppb; HDMF present at a concentration of at least about 13,000 ppb; and no more than about 300 ppb hexanal; and may further include (for example, but not by way of limitation) maltol present at a concentration of at least about 2000 ppb.

Step (a) of the method described herein above may be performed under any conditions that allow for the production of the thermally treated composition in accordance with the present disclosure. For example (but not by way of limitation), step (a) may be performed at a temperature in a range of from about 60° C. to about 80° C.

Also, the slurry formed in step (a) may have any pH so long as the thermally treated composition can be produced in accordance with the present disclosure. In certain non-limiting embodiments, the pH of the slurry falls in a range of from about 6 to about 8 (such as, but not limited to, in a range of from about 6 to about 7).

Similarly, step (b) of the method described herein above may be performed under any conditions that allow for the production of the thermally treated composition in accordance with the present disclosure. For example (but not by way of limitation), in step (b), the slurry may be subjected to a temperature in a range of from about 110° C. to about 140° C. under a pressure in a range of from about 3 bars to about 6 bars fora period of time in a range of from about 5 minutes to about 20 minutes.

Also, in certain non-limiting embodiments, the slurry formed in step (a) is pumped at a temperature in a range of from about 40° C. to about 80° C. into the equipment in which step (b) is performed.

The method described herein above may further include one or more additional steps. For example (but not by way of limitation), the method may include the step: (c) cooling the slurry to a temperature less than or equal to about 80° C. In a particular (but non-limiting) embodiment, the slurry is cooled to a temperature in a range of from about 50° C. to about 80°. In another particular (but non-limiting) embodiment, the slurry is cooled to ambient temperature, i.e., a temperature in a range of from about 20° C. to about 25° C.

The slurry formed in step (a) may be provided with any total solid content, so long as the thermally treated composition can be produced as described herein. In certain non-limiting embodiments, the slurry formed in step (a) is provided with a total solid content in a range of from about 65% to about 90%.

In addition, each of the ingredients present in the slurry (i.e., plant protein source, bulking agent, reducing sugar source, fat source, buffering agent, and water) can be present at any percent concentration (dry w/w), including (but not limited to): about 0.5%, about 1%, about 5%, about 10%, about 15%, about 20%, about 25%, about 30%, about 35%, about 40%, about 45%, about 50%, about 55%, about 60%, about 65%, about 70%, about 75%, about 80%, about 85%, about 95%, and about 95%, as well as any value therebetween. In addition, the concentration of each of the ingredients present in the slurry (including, but not limited to, each of plant protein source, bulking agent, reducing sugar source, fat source, buffering agent, and water) may fall within a range of any two of the values listed above, such as (but not limited to) a range of from about 5% to about 15%, a range of from about 10% to about 20%, a range of from about 20% to about 30%, a range of from about 30% to about 40%, a range of from about 40% to about 50%, a range of from about 50% to about 60%, a range of from about 60% to about 70%, a range of from about 70% to about 80%, a range of from about 80% to about 90%, a range of from about 5% to about 25%, a range of from about 10% to about 30%, a range of from about 15% to about 35%, a range of from about 20% to about 40%, a range of from about 25% to about 45%, a range of from about 30% to about 50%, a range of from about 35% to about 55%, a range of from about 40% to about 60%, a range of from about 45% to about 65%, a range of from about 50% to about 70%, a range of from about 55% to about 75%, a range of from about 60% to about 80%, a range of from about 65% to about 85%, a range of from about 70% to about 90%, a range of from about 75% to about 95%, a range of from about 5% to about 20%, a range of from about 10% to about 25%, a range of from about 15% to about 30%, a range of from about 20% to about 35%, a range of from about 25% to about 40%, a range of from about 30% to about 45%, a range of from about 35% to about 50%, a range of from about 40% to about 55%, a range of from about 45% to about 60%, a range of from about 50% to about 65%, a range of from about 55% to about 70%, a range of from about 60% to about 75%, a range of from about 65% to about 80%, a range of from about 10% to about 40%, a range of from about 20% to about 50%, a range of from about 30% to about 60%, a range of from about 40% to about 70%, a range of from about 50% to about 80%, a range of from about 60% to about 90%, and the like.

For example (but not by way of limitation), the slurry formed in step (a) may contain one or more of the following ingredients at the following concentrations: plant protein source present in a range of from about 5% to about 25% dry w/w; bulking agent present in a range of from about 30% to about 70% dry w/w; reducing sugar source is present in a range of from about 0.5% to about 60% dry w/w; buffering agent present in an amount to bring the pH of the slurry prepared in step (a) to between 6 and 8; fat source present in a range of from about 10% to about 30% dry w/w; and water present in a range of from about 10% to about 25% dry w/w. In another embodiment, the buffering agent is present in an amount to bring the pH of the slurry prepared in step (a) to between 6 and 7.

The method may include one or more additional process steps. For example (but not by way of limitation), the method may further include the step of hydrolyzing the slurry prior to step (b). Any enzyme(s) capable of hydrolyzing the slurry may be utilized in accordance with the present disclosure; in one non-limiting embodiment, the slurry is hydrolyzed using at least one enzyme having an activity such as (but not limited to) amylolytic, proteolytic, cellulolytic, hemicellulolytic, pectinolytic, glucanase or feruloyl esterase activity. In a particular (but non-limiting) example, the slurry is hydrolyzed using amylolytic enzyme(s).

Any type of plant protein source known in the art or otherwise contemplated herein may be utilized in accordance with the present disclosure. One non-limiting type of ingredient that may be utilized as the plant protein source is a pulse ingredient. Examples of pulse ingredients that may be utilized in accordance with the present disclosure include (but are not limited to) chickpeas, lentils, dry beans, faba beans, dry peas, cowpeas, bambara beans, pigeon peas, lupins, vetches, and combinations thereof.

Other non-limiting examples of plant protein sources that may be utilized in accordance with the present disclosure are oil seeds. Non-limiting examples of oil seed ingredients that may be utilized in accordance with the present disclosure include soybeans, peanuts, sunflower seeds, canola seeds, rapeseed, sesame seeds, golden linseeds, almonds, hemp seeds, pumpkin seeds, grapeseed, and combinations thereof.

Yet another non-limiting example of plant protein source that can be utilized in accordance with the present disclosure is carob seed. In addition, pseudocereals rich in protein, such as (for example but not by way of limitation) buckwheat and quinoa, can be utilized as plant protein sources in accordance with the present disclosure.

In certain non-limiting embodiments, the heat treated food or beverage product includes at least one cereal-based ingredient, as described in detail herein above.

Certain non-limiting embodiments of the present disclosure are directed to thermally treated compositions produced by the methods described or otherwise contemplated herein above.

Certain non-limiting embodiments of the present disclosure are directed to use of the thermally treated composition produced by the methods described or otherwise contemplated herein above, in a process of preparing a heat treated food or beverage product. The process includes the steps of: combining the thermally treated composition with one or more additional ingredients to form a mixture; and subjecting the mixture to one or more additional processing steps to form the heat treated food or beverage product. This second processing step is the typical main manufacturing step utilized in the production of prior art food or beverage products. Any treatment step known in the art or otherwise contemplated herein may be utilized as the second processing step; non-limiting examples of processes that can be used as the second treatment step include roller drying, extrusion cooking, drying, oven drying, spray drying, baking, retorting, toasting, cereal/fruit bar making, or combinations thereof.

Certain non-limiting embodiments of the present disclosure are directed to a method of producing a heat treated food or beverage product, that comprises the steps of: (a) forming a slurry comprising at least one plant protein source, at least one bulking agent, at least one reducing sugar source, at least one fat source, at least one buffering agent, and water; (b) subjecting the slurry to a heat treatment at a temperature in a range of from about 100° C. to about 150° C. under a pressure in a range of from about 2 bars to about 7 bars for a period of time in a range of from about 5 minutes to about 20 minutes to produce the thermally treated composition, and wherein at least one of: (i) the thermally treated composition has a reduced undesirable flavor of the at least one plant protein source when compared to a composition produced in the absence of step (b), wherein the undesirable flavor is selected from the group consisting of beany, green, earthy, hay-like, fishy, metallic, fatty, rancid, bitter, and astringent; and (ii) the thermally treated composition has an increased desirable flavor exhibiting a distinct flavor note when compared to a composition produced in the absence of step (b), wherein the distinct flavor note is selected from the group consisting of caramel, toffee, cookie, toasty, and sweet; (c) combining the thermally treated composition with one or more additional ingredients to form a mixture; and (d) subjecting the mixture to one or more additional processing steps to form the heat treated food or beverage product, wherein at least one additional processing step is selected from the group consisting of roller drying, extrusion cooking, drying, oven drying, spray drying, baking, retorting, toasting, cereal/fruit bar making, or combinations thereof.

The thermally treated composition and the additional ingredient(s) may be added to the processes/methods described herein above at any concentrations that allow for the production of the heat treated food or beverage products in accordance with the present disclosure. In certain non-limiting embodiments, the thermally treated composition is added in an amount in a range of from about 3% to about 30% dry w/w of the heat treated food or beverage product.

In addition, any ingredients may be utilized as the one or more additional ingredients that are combined with the thermally treated composition, so long as the combination results in the production of the heat treated food or beverage product in accordance with the present disclosure. One non-limiting example of any additional ingredient that may be utilized in a cereal-based ingredient. Thus, a cereal-based ingredient can be added either before or after the first heat treatment step of the processes/methods disclosed herein.

In a particular (but non-limiting) embodiment, the one or more additional ingredients comprises at least one cereal-based ingredient, and the one or more additional processing steps comprises roller drying.

In addition, the heat treated food or beverage product may have an increased concentration of at least one desirable odorant when compared to a food or beverage product produced in the absence of step (b). Non-limiting examples of desirable odorants include 2,3-butanedione (buttery), 4-hydroxy-2,5-dimethyl-3(2H)-furanone (HDMF; caramel), maltol (caramel), 4-vinylguaiacol (clove-like), 2-acetylthiazole (roasty), and/or 2 acetyl-2-thiazoline (roasty), as well as any combinations thereof.

In particular (but non-limiting) embodiments, the thermally treated composition or heat treated food or beverage product may have an increased amount of 2,3-butanedione when compared to a composition/food or beverage product produced in the absence of step (b). For example (but not by way of limitation), the amount of 2,3-butanedione present in the heat treated food or beverage product may be increased when compared to a food or beverage product produced in the absence of step (b) by a concentration factor of at least about 1.25-fold, at least about 1.5-fold, at least about 1.75-fold, at least about 2-fold, at least about 2.25-fold, at least about 2.5-fold, at least about 2.75-fold, at least about 3-fold, at least about 3.25-fold, at least about 3.5-fold, at least about 3.75-fold, at least about 4-fold, at least about 4.25-fold, at least about 4.5-fold, at least about 4.75-fold, at least about 5-fold, at least about 5.5-fold, at least about 6-fold, at least about 6.5-fold, at least about 7-fold, at least about 7.5-fold, at least about 8-fold, at least about 8.5-fold, at least about 9-fold, at least about 9.5-fold, and at least about 10-fold, or higher. In addition, any specific concentration of 2,3-butanedione may be present, so long as the concentration is increased when compared to the prior art. Non-limiting examples of 2,3-butanedione concentrations that may be present in the thermally treated composition or heat treated food or beverage product include at least about 300 ppb, at least about 400 ppb, at least about 500 ppb, at least about 600 ppb, at least about 700 ppb, at least about 800 ppb, at least about 900 ppb, at least about 1000 ppb, at least about 1100 ppb, at least about 1200 ppb, at least about 1300 ppb, at least about 1400 ppb, at least about 1500 ppb, at least about 1600 ppb, at least about 1700 ppb, at least about 1800 ppb, at least about 1900 ppb, at least about 2000 ppb, or higher. In a particular (but non-limiting) embodiment, the amount of 2,3-butanedione present in the thermally treated composition or heat treated food or beverage product is increased by at least 5-fold when compared to a thermally treated composition or food or beverage product produced in the absence of step (b), and/or the 2,3-butanedione concentration is at least about 500 ppb.

In particular (but non-limiting) embodiments, the thermally treated composition or heat treated food or beverage product may have an increased amount of HDMF when compared to a composition or food or beverage product produced in the absence of step (b). For example (but not by way of limitation), the amount of HDMF present in the thermally treated composition or heat treated food or beverage product may be increased when compared to a composition or food or beverage product produced in the absence of step (b) by a concentration factor of at least about 2-fold, at least about 3-fold, at least about 4-fold, at least about 5-fold, at least about 6-fold, at least about 7-fold, at least about 8-fold, at least about 9-fold, at least about 10-fold, at least about 11-fold, at least about 12-fold, and at least about 13-fold, at least about 14-fold, at least about 15-fold, at least about 16-fold, at least about 17-fold, at least about 18-fold, at least about 19-fold, at least about 20-fold, at least about 21-fold, at least about 22-fold, at least about 23-fold, at least about 24-fold, at least about 25-fold, at least about 26-fold, at least about 27-fold, at least about 28-fold, at least about 29-fold, at least about 30-fold, or higher. In addition, any specific concentration of HDMF may be present, so long as the concentration is increased when compared to the compositions/products produced in the absence of step (b). Non-limiting examples of HDMF concentrations that may be present in the thermally treated composition or heat treated food or beverage product include at least about 3000 ppb, at least about 4000 ppb, at least about 5000 ppb, at least about 6000 ppb, at least about 7000 ppb, at least about 8000 ppb, at least about 9000 ppb, at least about 10000 ppb, at least about 11000 ppb, at least about 12000 ppb, at least about 13000 ppb, at least about 14000 ppb, at least about 15000 ppb, at least about 16000 ppb, at least about 17000 ppb, at least about 18000 ppb, at least about 19000 ppb, at least about 20000 ppb, at least about 21000 ppb, at least about 22000 ppb, at least about 23000 ppb, at least about 24000 ppb, at least about 25000 ppb, or higher. In a particular (but non-limiting) embodiment, the amount of HDMF present in the thermally treated composition or heat treated food or beverage product is increased by at least 5-fold when compared to a composition or food or beverage product produced in the absence of step (b), and/or the HDMF concentration is at least about 8,000 ppb.

In particular (but non-limiting) embodiments, the thermally treated composition or heat treated food or beverage product may have an increased amount of maltol when compared to a composition or food or beverage product produced in the absence of step (b). For example (but not by way of limitation), the amount of maltol present in the thermally treated composition or heat treated food or beverage product may be increased when compared to a composition or food or beverage product produced in the absence of step (b) by a concentration factor of at least about 1.2-fold, at least about 1.25-fold, at least about 1.5-fold, at least about 1.75-fold, at least about 2-fold, at least about 2.25-fold, at least about 2.5-fold, at least about 2.75-fold, at least about 3-fold, at least about 3.25-fold, at least about 3.5-fold, at least about 3.75-fold, at least about 4-fold, at least about 4.25-fold, at least about 4.5-fold, at least about 4.75-fold, at least about 5-fold, at least about 5.5-fold, at least about 6-fold, at least about 6.5-fold, at least about 7-fold, at least about 7.5-fold, at least about 8-fold, at least about 8.5-fold, at least about 9-fold, at least about 9.5-fold, and at least about 10-fold, or higher. In addition, any specific concentration of maltol may be present, so long as the concentration is increased when compared to a composition/ product produced in the absence of step (b). Non-limiting examples of maltol concentrations that may be present in the thermally treated composition or heat treated food or beverage product include at least about 1000 ppb, at least about 1500 ppb, at least about 2000 ppb, at least about 2500 ppb, at least about 3000 ppb, at least about 3500 ppb, at least about 4000 ppb, at least about 4500 ppb, at least about 5000 ppb, at least about 6000 ppb, at least about 7000 ppb, at least about 8000 ppb, at least about 9000 ppb, at least about 10000 ppb, at least about 11000 ppb, at least about 12000 ppb, at least about 13000 ppb, at least about 14000 ppb, at least about 15000 ppb, at least about 16000 ppb, at least about 17000 ppb, at least about 18000 ppb, at least about 19000 ppb, at least about 20000 ppb, at least about 21000 ppb, at least about 22000 ppb, at least about 23000 ppb, at least about 24000 ppb, at least about 25000 ppb, or higher. In a particular (but non-limiting) embodiment, the amount of maltol present in the thermally treated composition or heat treated food or beverage product is increased by at least 1.25-fold when compared to a composition or food or beverage product produced in the absence of step (b), and/or the maltol concentration is at least about 1500 ppb.

In particular (but non-limiting) embodiments, the thermally treated composition or heat treated food or beverage product may have an increased amount of 4-vinylguaiacol when compared to a composition or food or beverage product produced in the absence of step (b). For example (but not by way of limitation), the amount of 4-vinylguaiacol present in the thermally treated composition or heat treated food or beverage product may be increased when compared to a composition or food or beverage product produced in the absence of step (b) by a concentration factor of at least about 1.25-fold, at least about 1.5-fold, at least about 1.75-fold, at least about 2-fold, at least about 2.25-fold, at least about 2.5-fold, at least about 2.75-fold, at least about 3-fold, at least about 3.25-fold, at least about 3.5-fold, at least about 3.75-fold, at least about 4-fold, at least about 4.25-fold, at least about 4.5-fold, at least about 4.75-fold, at least about 5-fold, at least about 5.5-fold, at least about 6-fold, at least about 6.5-fold, at least about 7-fold, at least about 7.5-fold, at least about 8-fold, at least about 8.5-fold, at least about 9-fold, at least about 9.5-fold, and at least about 10-fold, or higher. In addition, any specific concentration of 4-vinylguaiacol may be present, so long as the concentration is increased when compared to a composition/product produced in the absence of step (b). Non-limiting examples of 4-vinylguaiacol concentrations that may be present in the thermally treated composition or heat treated food or beverage product include at least about 100 ppb, at least about 200 ppb, at least about 300 ppb, at least about 400 ppb, at least about 500 ppb, at least about 600 ppb, at least about 700 ppb, at least about 800 ppb, at least about 900 ppb, at least about 1000 ppb, at least about 1100 ppb, at least about 1200 ppb, at least about 1300 ppb, at least about 1400 ppb, at least about 1500 ppb, at least about 1600 ppb, at least about 1700 ppb, at least about 1800 ppb, at least about 1900 ppb, at least about 2000 ppb, or higher. In a particular (but non-limiting) embodiment, the amount of 4-vinylguaiacol present in the thermally treated composition or heat treated food or beverage product is increased by at least 1.25-fold when compared to a composition or food or beverage product produced in the absence of step (b), and/or the 4-vinylguaiacol concentration is at least about 100 ppb.

In particular (but non-limiting) embodiments, the thermally treated composition or heat treated food or beverage product may have an increased amount of 2-acetylthiazole when compared to a composition or food or beverage product produced in the absence of step (b). For example (but not by way of limitation), the amount of 2-acetylthiazole present in the thermally treated composition or heat treated food or beverage product may be increased when compared to a composition or food or beverage product produced in the absence of step (b) by a concentration factor of at least about 1.2-fold, at least about 1.25-fold, at least about 1.3-fold, at least about 1.4-fold, at least about 1.5-fold, at least about 1.6-fold, at least about 1.7-fold, at least about 1.75-fold, at least about 1.8-fold, at least about 1.9-fold, at least about 2-fold, at least about 2.25-fold, at least about 2.5-fold, at least about 2.75-fold, at least about 3-fold, at least about 3.25-fold, at least about 3.5-fold, at least about 3.75-fold, at least about 4-fold, at least about 4.25-fold, at least about 4.5-fold, at least about 4.75-fold, at least about 5-fold, at least about 5.25-fold, at least about 5.5-fold, at least about 5.75-fold, and at least about 6-fold, or higher. In a particular (but non-limiting) embodiment, the amount of 2-acetylthiazole present in the thermally treated composition or heat treated food or beverage product in increased by at least 1.25-fold when compared to a composition or food or beverage product produced in the absence of step (b). In addition, any specific concentration of 2-acetylthiazole may be present, so long as the concentration is increased when compared to composition or product produced in the absence of step (b).

In particular (but non-limiting) embodiments, the thermally treated composition or heat treated food or beverage product may have an increased amount of 2-acetyl-2-thiazoline when compared to a composition or food or beverage product produced in the absence of step (b). For example (but not by way of limitation), the amount of 2-acetyl-2-thiazoline present in the thermally treated composition or heat treated food or beverage product may be increased when compared to a composition or food or beverage product produced in the absence of step (b) by a concentration factor of at least about 1.2-fold, at least about 1.25-fold, at least about 1.3-fold, at least about 1.4-fold, at least about 1.5-fold, at least about 1.6-fold, at least about 1.7-fold, at least about 1.75-fold, at least about 1.8-fold, at least about 1.9-fold, at least about 2-fold, at least about 2.25-fold, at least about 2.5-fold, at least about 2.75-fold, at least about 3-fold, at least about 3.25-fold, at least about 3.5-fold, at least about 3.75-fold, at least about 4-fold, at least about 4.25-fold, at least about 4.5-fold, at least about 4.75-fold, at least about 5-fold, at least about 5.25-fold, at least about 5.5-fold, at least about 5.75-fold, and at least about 6-fold, or higher. In a particular (but non-limiting) embodiment, the amount of 2-acetyl-2-thiazoline present in the thermally treated composition or heat treated food or beverage product in increased by at least 1.25-fold when compared to a composition or food or beverage product produced in the absence of step (b). In addition, any specific concentration of 2-acetyl-2-thiazoline may be present, so long as the concentration is increased when compared to a composition or product produced in the absence of step (b).

Alternatively (and/or in addition thereto), the thermally treated composition or heat treated food or beverage product may have a reduced undesirable flavor of the at least one plant protein source when compared to a composition or food or beverage product produced in the absence of step (b). For example (but not by way of limitation), the undesirable flavor may be selected from the group consisting of beany, green, earthy, hay-like, fishy, metallic, fatty, rancid, bitter, and astringent. Non-limiting examples of undesired odorants or non-volatile off-flavor compounds include aldehydes (such as, but not limited to, butanal, pentanal, hexanal, heptanal, octanal, nonanal, benzaldehyde, and the like), alcohols (such as, but not limited to, butanol, ethanol, propanol, hexanol, pentenol, octanol, benzyl alcohol, and the like), ketones (such as, but not limited to, acetone, butanone, pentanone, heptanone, octanone, nonanone, octenone, octadienone, methylheptenone, acetophenone, methylheptadione, isoflavones, and the like), acids (acetic acid, butanoic acid, pentanoic acid, hexanoic acid, propanoic acid, methylbutanoic acid, and the like), pyrazines, furans, sulfur compounds, saponins, hydrocarbons, phenolic compounds, alkaloids, and the like.

In particular (but non-limiting) embodiments, the thermally treated composition or heat treated food or beverage product may have a decreased amount of hexanal when compared to a composition or food or beverage product produced in the absence of step (b). For example (but not by way of limitation), the amount of hexanal present in the thermally treated composition or heat treated food or beverage product is less than an amount of hexanal present in a composition or food or beverage product produced in the absence of step (b) by a concentration factor of at least about 1.25-fold, at least about 1.5-fold, at least about 1.75-fold, at least about 2-fold, at least about 2.25-fold, at least about 2.5-fold, at least about 2.75-fold, at least about 3-fold, at least about 3.25-fold, at least about 3.5-fold, at least about 3.75-fold, at least about 4-fold, at least about 4.25-fold, at least about 4.5-fold, at least about 4.75-fold, at least about 5-fold, at least about 5.5-fold, at least about 6-fold, at least about 6.5-fold, at least about 7-fold, at least about 7.5-fold, at least about 8-fold, at least about 8.5-fold, at least about 9-fold, at least about 9.5-fold, and at least about 10-fold, or higher. In addition, any specific concentration of hexanal may be present, so long as the concentration is decreased when compared to a composition or product produced in the absence of step (b). Non-limiting examples of hexanal concentrations that may be present in the thermally treated composition or heat treated food or beverage product include less than about 1000 ppb, less than about 900 ppb, less than about 800 ppb, less than about 700 ppb, less than about 600 ppb, less than about 500 ppb, less than about 400 ppb, less than about 300 ppb, less than about 200 ppb, or lower. In a particular (but non-limiting) embodiment, the amount of hexanal present in the thermally treated composition or heat treated food or beverage product is decreased by at least 10-fold when compared to a composition or food or beverage product produced in the absence of step (b), and/or the hexanal concentration is less than about 500 ppb.

Certain non-limiting embodiments of the present disclosure are also directed to a heat treated food or beverage product produced by any of the processes/methods disclosed herein above or otherwise contemplated herein. In particular (but non-limiting) embodiments, the heat treated food or beverage product may have improved organoleptic properties and/or an increased content of one or more aroma compounds when compared to a food or beverage product produced in the absence of step (b). In addition, the heat treated food or beverage product may possess any of the characteristics described herein above or otherwise contemplated herein.

EXAMPLES

Examples are provided hereinbelow. However, the present disclosure is to be understood to not be limited in its application to the specific experimentation, results, and laboratory procedures disclosed herein. Rather, the Examples are simply provided as one of various embodiments and are meant to be exemplary, not exhaustive.

Analysis of Aroma Compounds

Content of aroma compounds in cereal products was determined using Head Space Solid Phase Micro Extraction in combination with Gas Chromatography and tandem Mass Spectrometry (HS-SPME-GC/MS/MS). Quantification was accomplished by Stable Isotope Dilution Analysis (SIDA) using isotopically labelled internal standards.

The sample of thermally treated composition (0.5±0.05 g) or roller-dried cereal-based product (1 g±0.0025 g) was weighed into a 20 mL headspace vial. Ultrapure water (10 mL) and methanol solution of internal standards (20 µL) were added. The vial was closed with a screw cap, and the mixture was homogenized by means of a vortex agitator for 5 to 10 seconds and then analyzed by HS-SPME-GC/MS/MS. Each sample was prepared in triplicate by three independent work-ups.

For HS-SPME, the incubation (5 minutes) and extraction (30 minutes) were performed at 70° C. DVB-CAR-PDMS fiber of 2 cm (Supelco, Sigma Aldrich, St. Louis, Mo.) was used for the extraction under agitator speed of 500 rpm. The fiber was injected into a GC-MS/MS instrument, and aroma compounds were desorbed in split mode (ratio 5:1) at 250° C. for 5 minutes.

For GC/MS, an Agilent 7890A gas chromatograph and Agilent 7010 triple quadrupole mass spectrometer with high sensitivity electron ionization source (HS-EI) were used. Gas chromatographic separations were achieved on a DB-624-UI column (60 m×0.25 mm i.d., film thickness 1.4 µm; J&W Scientific, Folsom, Calif.). The temperature program of the oven started at 50° C.; the temperature raised by 5° C./minute to 200° C. and then by 30° C./minute to 250° C. and maintained constant for 10 minutes. Helium was used as a carrier gas with a constant flow of 1.0 mL/minute.

Example 1: Preparation of Thermally Treated Compositions

Five thermally treated liquid formulas were prepared having the compositions reported in Table 1. Solid ingredients were mixed with water in the tank at 75° C. using a high shear mixer. Fat was then added under high shear mixing. The resulting soup was transferred to the reaction section where steam was injected into the soup in order to increase the temperature to 130° C. under a simultaneous increase of pressure to 5 bar. Such conditions were maintained for 12 minutes. Subsequently, pressure was released, and the resulting mixture having a total solid content between 72% and 79% was rapidly cooled down below 75° C.

TABLE 1

Formulas of Thermally Treated Compositions

| Ingredient | Formula A (milk) | Formula B (carob) | Formula C (soy) | Formula D (chickpea) | Formula E (red lentils) |
|---|---|---|---|---|---|
| Sucrose | 42.62% | 44.23% | 42.56% | 38.52% | 39.38% |
| Fat | 23.56% | 24.44% | 19.87% | 21.29% | 23.56% |
| Water | 19.46% | 20.19% | 19.43% | 17.58% | 19.46% |
| Skimmed milk powder | 10.66% | | | | |
| Carob seed flour | | 7.30% | | | |

TABLE 1-continued

Formulas of Thermally Treated Compositions

| Ingredient | Formula A (milk) | Formula B (carob) | Formula C (soy) | Formula D (chickpea) | Formula E (red lentils) |
|---|---|---|---|---|---|
| Soy flour | | | 14.05% | | |
| Chickpea flour | | | | 19.26% | |
| Red lentils flour | | | | | 14.18% |
| Soy lecithin | | | 0.40% | | |
| Dextrose | 2.98% | 3.10% | 2.98% | 2.70% | 2.76% |
| Dipotassium phosphate | 0.72% | 0.75% | 0.72% | 0.65% | 0.67% |

Non-treated premixes were also prepared based on the formulas in Table 1 but in the absence of the thermal treatment step described herein above.

Example 2: Sensory Evaluation of Thermally Treated Composition

Thermally treated compositions and their corresponding non-treated premixes prepared as described in Example 1 were evaluated by eight trained assessors. The compositions were sniffed and tasted either as such or after the reconstitution of 20 g of the composition in 180 g of semi-skimmed milk (2.5% fat) at 50° C. using a high speed POLYTRON® homogenizer.

Typical off-flavors such as beany, green, earthy, hay-like, fishy, metallic, slightly bitter, and astringent were detected in non-treated premixes prepared with plant protein ingredients. These off-notes were especially strong in non-treated premixes of Formula D (chick pea) and formula E (red lentils), but were absent in Formula A with skimmed milk powder, which had a milky and sweet taste. Pleasant caramel, toffee, cookie, and sweetish notes and, most importantly, no or significantly reduced off-notes were detected in all thermally treated compositions. In addition, thermal treatment triggered significant browning and an increase of the viscosity of the premixes. The sensory evaluation showed a significant impact of thermal treatment on organoleptic properties of the composition.

Example 3: Comparison of Aroma Content in Thermally Treated Composition

The content of selected key aroma compounds was quantified in thermally treated compositions and in their corresponding non-treated premixes prepared as described in Example 1. The concentrations of the most abundant odorants are shown in Table 2.

The results indicated that heat treatment results in significant generation of desirable odorants such as 2,3-butanedione (buttery), 4-hydroxy-2,5-dimethyl-3(2H)-furanone abbreviated further as HDMF (caramel), maltol (caramel), and 4-vinylguaiacol (clove-like). The majority of these odorants were not detected or were present in very low concentrations before the thermal treatment. On the other hand, it was observed that hexanal (green), a major off-flavor compound in plant protein ingredients, was significantly reduced after the treatment of Formula D (chickpea, by a concentration factor of 490) and Formula E (red lentils, by a concentration factor of 872), respectively. The degradation of hexanal could not be demonstrated for the Formula C with soy, as its level in the non-heated premix was already very low. This is due to toasted soy flour used in the trial. Toasting, applied by the supplier, is likely responsible for reduced amount of hexanal. As hexanal is known as one of the major off-flavor compounds of soybeans, application of the described process to soy recipes with elevated hexanal levels will reduce the amount of hexanal present in the same way as was seen with the recipes containing chickpeas or red lentils.

Overall, the thermal treatment resulted in generation of odorants imparting pleasant flavor notes (i.e., caramel, toffee, cookie, etc.) as well as degradation of odorants responsible for beany and greenish off-flavors. This phenomenon contributed to the improvement of organoleptic properties of the composition as described in Example 2.

Interestingly, compositions with plant proteins generated significantly more HDMF (factor from 1.9 to 3.9) and 4-vinylguaiacol (factor from 7.4 to 105.1) than compositions with milk protein. The results are reported in FIG. 1. As the levels of both odorants are not proportional to the amount of the protein rich ingredient in the recipe, this phenomenon cannot be explained by the dosage. It is therefore attributed to the unique potential of plant protein ingredients that was surprisingly discovered.

Example 4: Preparation of Cereal-Based Product with Plant Proteins by Roller-Drying The cereal-based products were prepared having the compositions reported in Table 3. Two products were prepared from each recipe using two different technologies:
  i) A conventional process comprising ingredients as in Formulas 1-3 of Table 3; and
  ii) the 'new process' (the method of the present disclosure) involving thermally treated compositions of Formulas B, C, and D prepared as described in Example 1.

In the 'new process,' the thermally treated compositions were incorporated at a dry weight dosage of 10% of the overall cereal base recipe. The ingredients were homogenized with water. The slurry underwent the hydrolysis process with amylase solution which was injected in-line just before the static mixer where steam was then injected to reach the optimum temperature for the enzyme's hydrolytic activity and processed for a residence time of around one minute, before treatment with steam injection for hygienic reasons and enzyme inactivation. The slurry (comprising around 40% w/w solids) was then subjected to a roller drying to provide the semi-finished product. Roller-drying was performed on a single-cylinder (mono-cylinder) roller-dryer operating at temperature of 180 to 183° C. and roller speed of 4.5 rpm. The dried product with moisture content of about 2% was then milled to particle size of about 2 mm and dry-mixed with skimmed milk powder and calcium carbonate to provide finished food product (both latter ingredients added entirely by dry-mixing).

TABLE 2

Concentrations of Odorants (µg/kg) Determined in Thermally Treated Compositions ("After Treatment") and Their Corresponding Non-Treated Premixes ("Before Treatment")

| Odorant | Formula A (milk) | | Formula B (carob) | | Formula C (soy) | | Formula D (chickpea) | | Formula E (red lentils) | |
|---|---|---|---|---|---|---|---|---|---|---|
| | Before treatment | After treatment | Before treatment | After treatment | Before treatment | After treatment | Before treatment | After treatment | Before treatment | After treatment |
| 2,3-butanedione | n.d. | 2449 | n.d. | 1418 | n.d. | 1627 | 297 | 1547 | 200 | 1396 |
| HDMF | n.d. | 6984 | n.d. | 13408 | n.d. | 27495 | n.d. | 19493 | n.d. | 14497 |
| Maltol | 204 | 20284 | n.d. | n.d. | 5500 | 30067 | 2320 | 18325 | 1795 | 1984 |
| Hexanal | 41 | 133 | 76 | 193 | 239 | 218 | 132555 | 270 | 101977 | 117 |
| 4-vinylguaiacol | 7 | 12 | 171 | 1269 | 297 | 878 | 377 | 521 | 104 | 89 |

Prepared as described in Example 1 (n.d., dot detected)

TABLE 3

Composition of Cereal-Based Products Processed by Roller-Drying

| | % (dry matter) | | |
|---|---|---|---|
| Ingredient | Formula 1 (carob) | Formula 2 (soy) | Formula 3 (chickpea) |
| Refined wheat flour | 55.65% | 42.52% | 35.18% |
| Whole grain wheat flour | | 18.98% | 17.32% |
| Skimmed milk powder | 24.54% | 13.57% | 17.97% |
| Sucrose | 9.71% | 8.61% | 9.37% |
| Fat | 7.82% | 9.58% | 10.09% |
| Carob seed flour | 1.03% | | |
| Soy flour | | 5.41% | |
| Chick pea flour | | | 9.07% |
| Dextrose | 0.46% | 0.44% | 0.28% |
| Dipotassium Phosphate | 0.60% | 0.65% | 0.55% |
| Calcium carbonate | 0.18% | 0.18% | 0.17% |
| Lecithin soy | | 0.06% | |
| Enzyme (alpha-amylase) | 0.006% | 0.002% | 0.002% |

Figure 2:
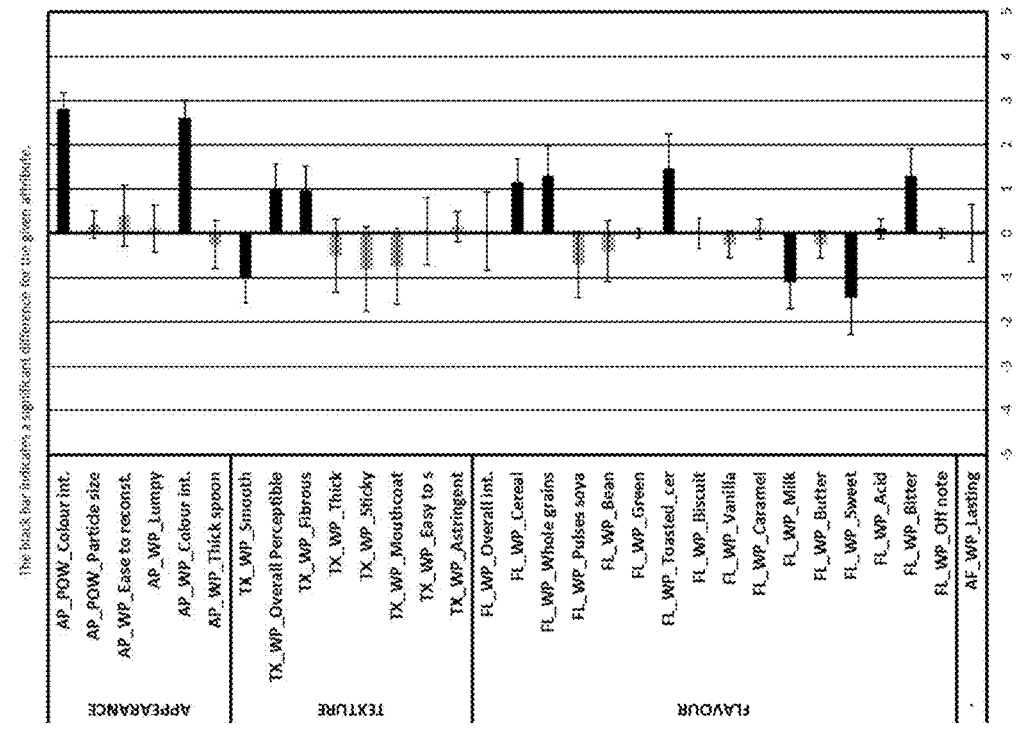
FIG. 2 is a graphical representation of the results of comparative tests for individual formulas produced with the thermally treated compositions of the present disclosure. Deviations of the product made with the thermally treated composition are compared to product made by a conventional process (set as zero).
Figure 2:
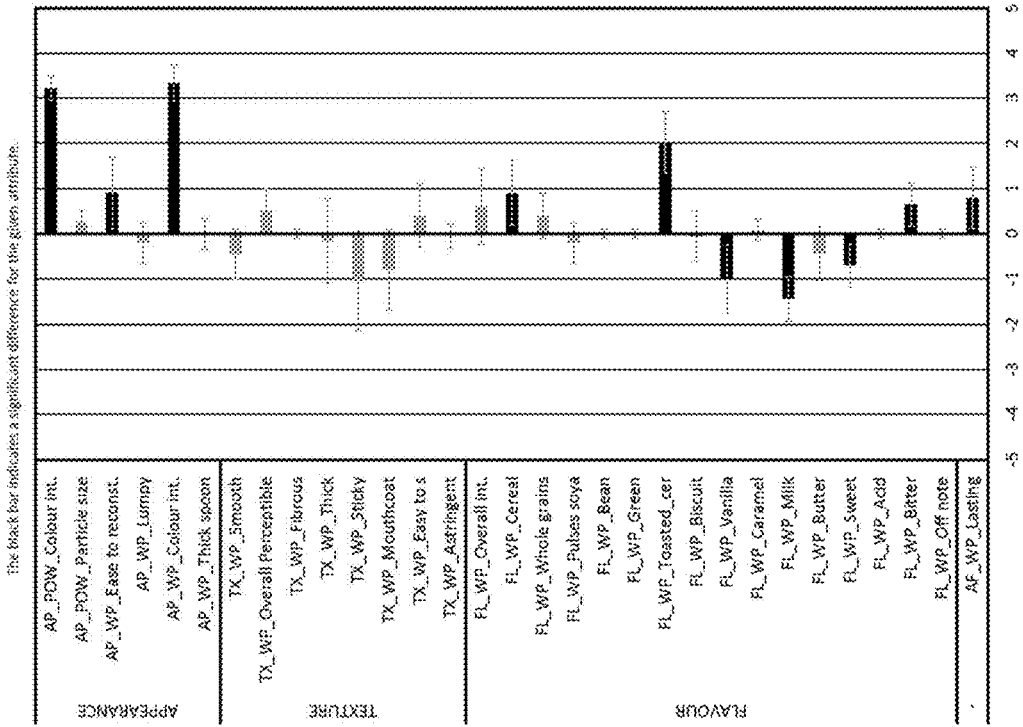
Figure 2:
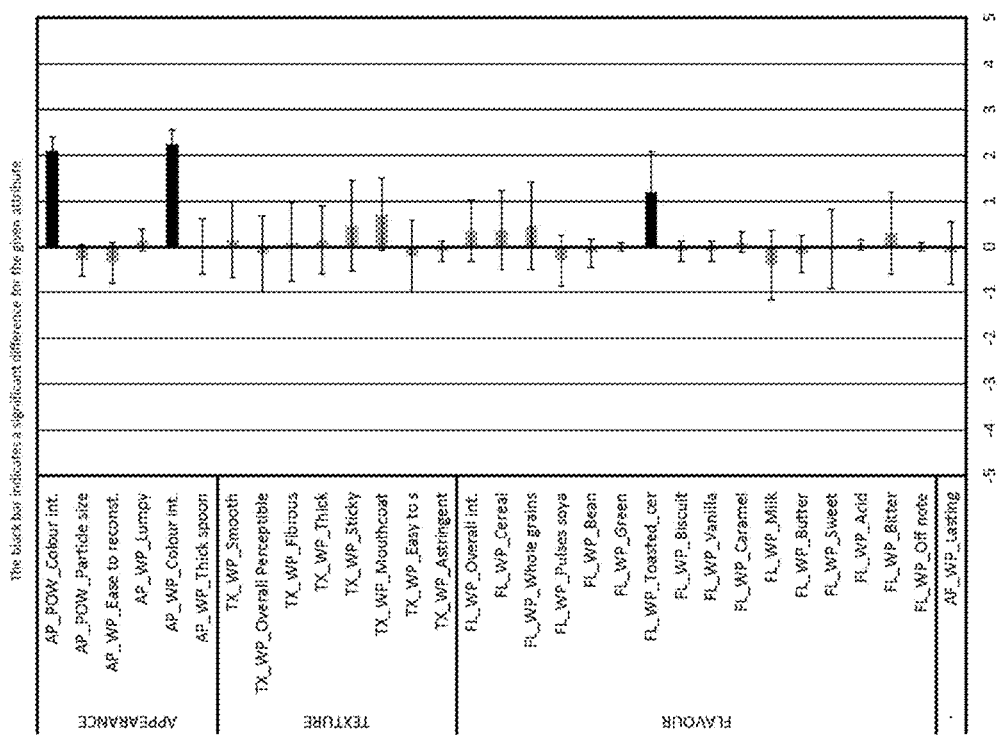

Example 5: Sensory Evaluation of Finished Cereal-Based Products with Plant Proteins The six cereal-based products prepared as described in Example 4 were evaluated after reconstitution of 50 g of the powder in 160 mL water at 50° C. Sensory differences between the two products having the same formula and produced by different processes ('conventional' and 'new') were evaluated. A trained sensory panel composed of 10 assessors evaluated 31 attributes using a methodology of comparative profile. The results for individual formulas are depicted in FIG. 2. They are expressed as deviations (in a scale of from −5 to +5) of the product made by the 'new' process as compared to product made by the 'conventional' process set as zero.

The differences between the two samples were determined with a confidence interval of 95% and were dependent on the Formula. Overall, the panel detected significantly higher color intensity (both in the powder and in the pap) and significantly enhanced toasted notes in the product manufactured with the 'new' process.

Figure 3:
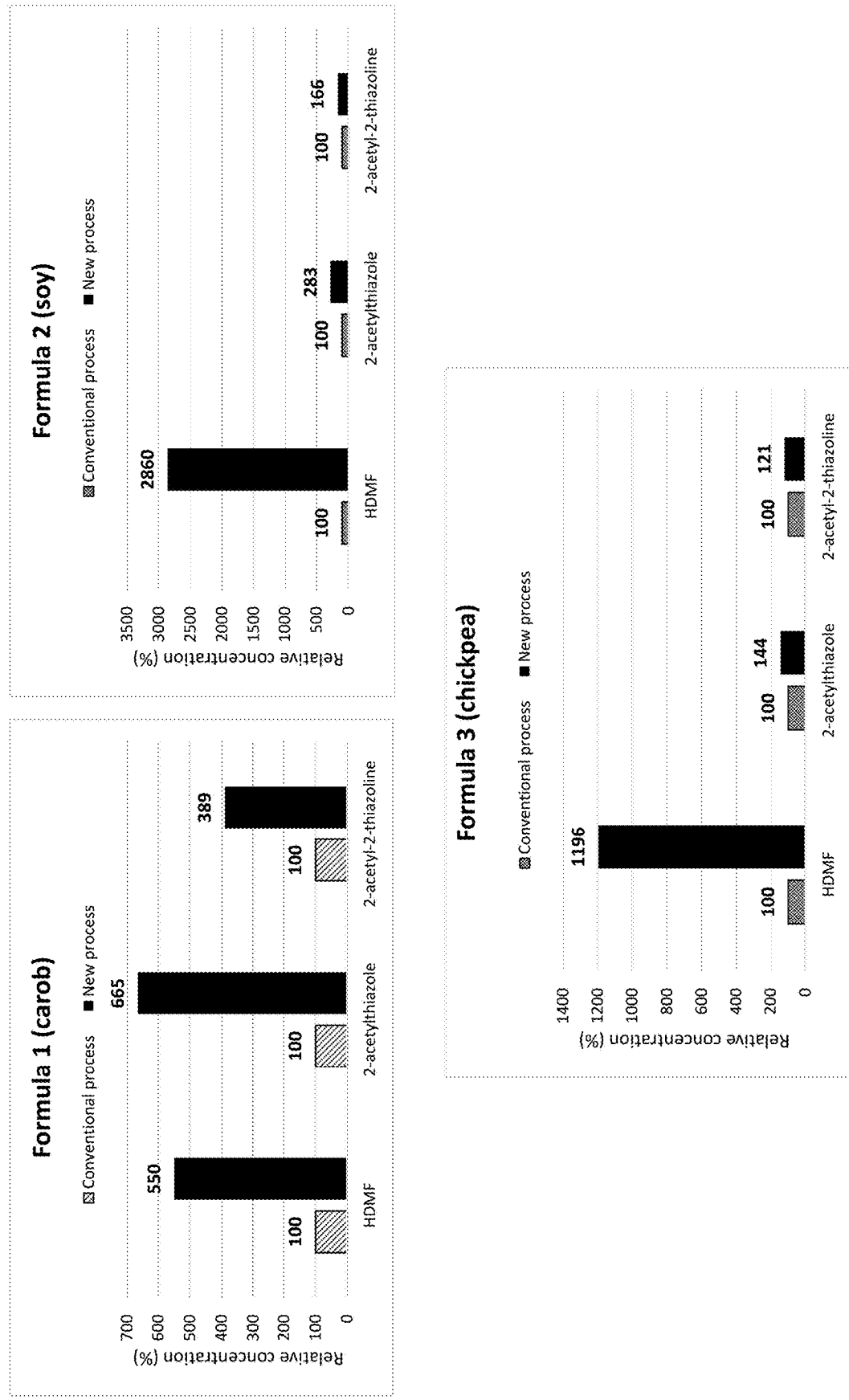
FIG. 3 contains graphical representations of relative concentrations (%) of odorants in three formulas of product produced with the thermally treated composition of the present disclosure as compared to the concentrations of odorants present in the same product formulas but produced by a conventional process (set as 100%). Formula 1, carob; Formula 2, soy; and Formula 3, chickpea.

Example 6: Comparison of Aroma Content in the Finished Cereal-Based Products with Plant Proteins In order to evaluate impact of the process technology ('conventional' versus 'new') on the aroma profile, the content of selected key aroma compounds was quantified in the semi-finished cereal-based product produced by roller-drying as described in Example 4. Among the monitored odorants, the 'new' process resulted in significantly increased levels of HDMF (caramel), 2-acetylthiazole (roasty) and 2-acetyl-2-thiazoline (roasty). Depending on the formula, the factor of increase ranged from 5.5 to 28.6 for HDMF, from 1.4 to 6.7 for 2-acetylthiazole and from 1.2 to 3.9 for 2-acetyl-2-thiazoline. The results are reported in FIG. 3, which depicts relative concentration (%) of the odorants in the product produced by the 'new' process technology compared to the concentration of odorants in the product produced by the 'conventional' process technology (set as 100%).

Example 7: Preparation of Cereal-Based Product by Roller-Drying

Two cereal-based products were prepared having the compositions reported in Table 4. Both products were prepared by the 'new process' involving thermally treated compositions Formula A (milk) and Formula B (carob) prepared as described in Example 1. The thermally treated compositions were incorporated at a dry weight dosage of 10% of the overall cereal base recipe. The cereal-based products were prepared by roller-drying as described in Example 4 with omission of the dry-mixing step; thus, all ingredients in the formula were mixed in wet and underwent the drying step.

TABLE 4

Composition of Cereal-Based Products Processed by Roller-Drying

| | % (dry matter) | |
|---|---|---|
| Ingredient | Formula 4 (milk) | Formula 5 (carob) |
| Refined wheat flour | 65.18% | 65.15% |
| Skimmed milk powder | 9.23% | 6.95% |
| Sucrose | 14.66% | 15.29% |
| Fat | 9.85% | 9.85% |
| Carob seed flour | | 1.61% |
| Dextrose | 0.63% | 0.69% |
| Calcium carbonate | 0.22% | 0.22% |
| Dipotassium Phosphate | 0.16% | 0.17% |
| Enzyme (alpha-amylase) | 0.007% | 0.007% |

Example 8: Sensory Evaluation of Finished Cereal-Based Products

Figure 4:
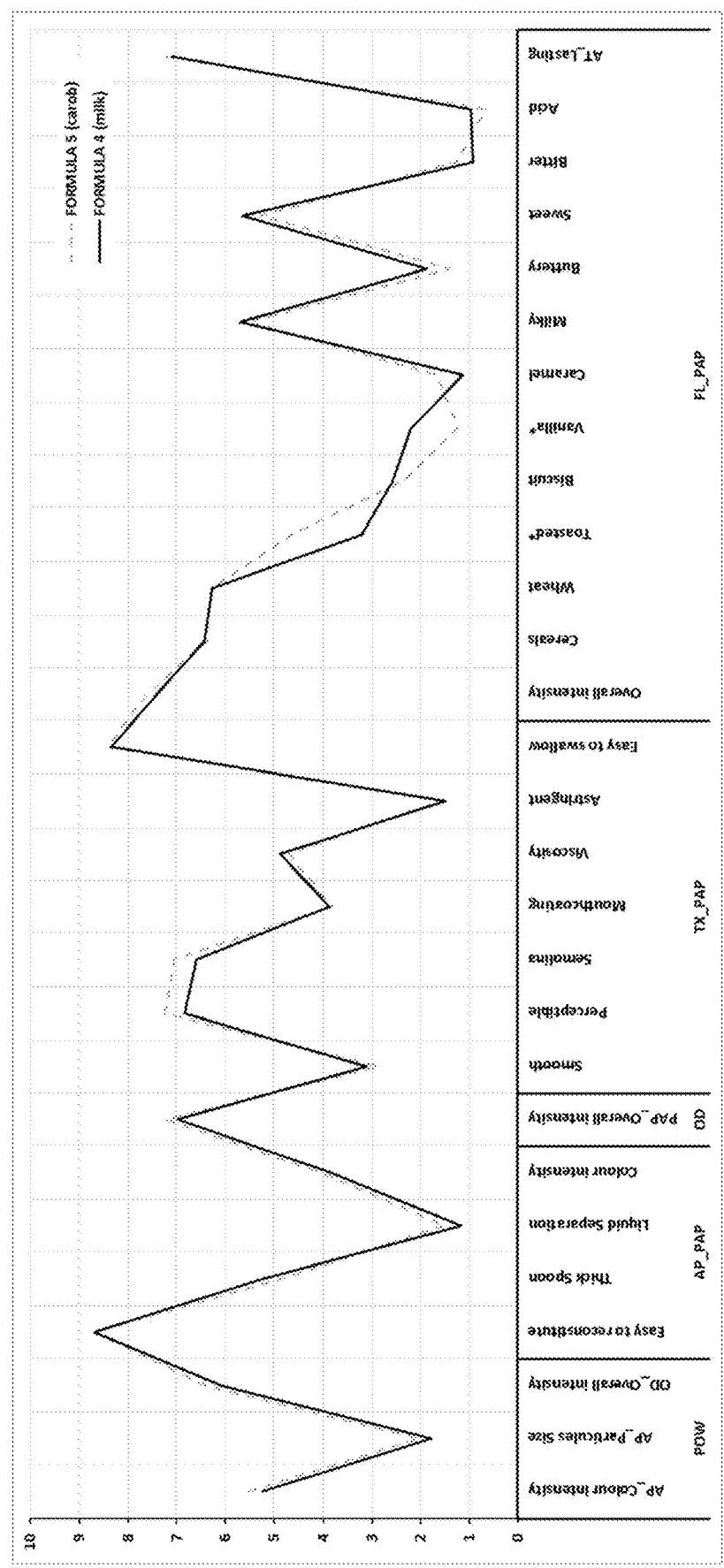
FIG. 4 is a graphical representation of monadic sensory profiles (28 attributes) for cereal-based products of Formula 4 (containing skimmed milk powder) and Formula 5 (containing carob seed flour).

Two cereal-based products prepared as described in Example 7 were evaluated after reconstitution of 27.3 g of the product in 100 mL milk (2.5% fat) at 50° C. Sensory evaluation was performed by a trained sensory panel composed of 12 assessors. A Monadic sensory profile (28 attributes) conducted on appearance, texture, flavor, and aroma is depicted in FIG. 4.

The sensory evaluation revealed significantly increased toasted notes and decreased vanilla notes in Formula 5, which contains carob seed flour, as compared to Formula 4, which contains only milk powder. Formula 5 also revealed slightly increased perceptible and semolina texture and caramel notes.

Example 9: Comparison of Aroma Content in the Finished Cereal-Based Products

Figure 5:
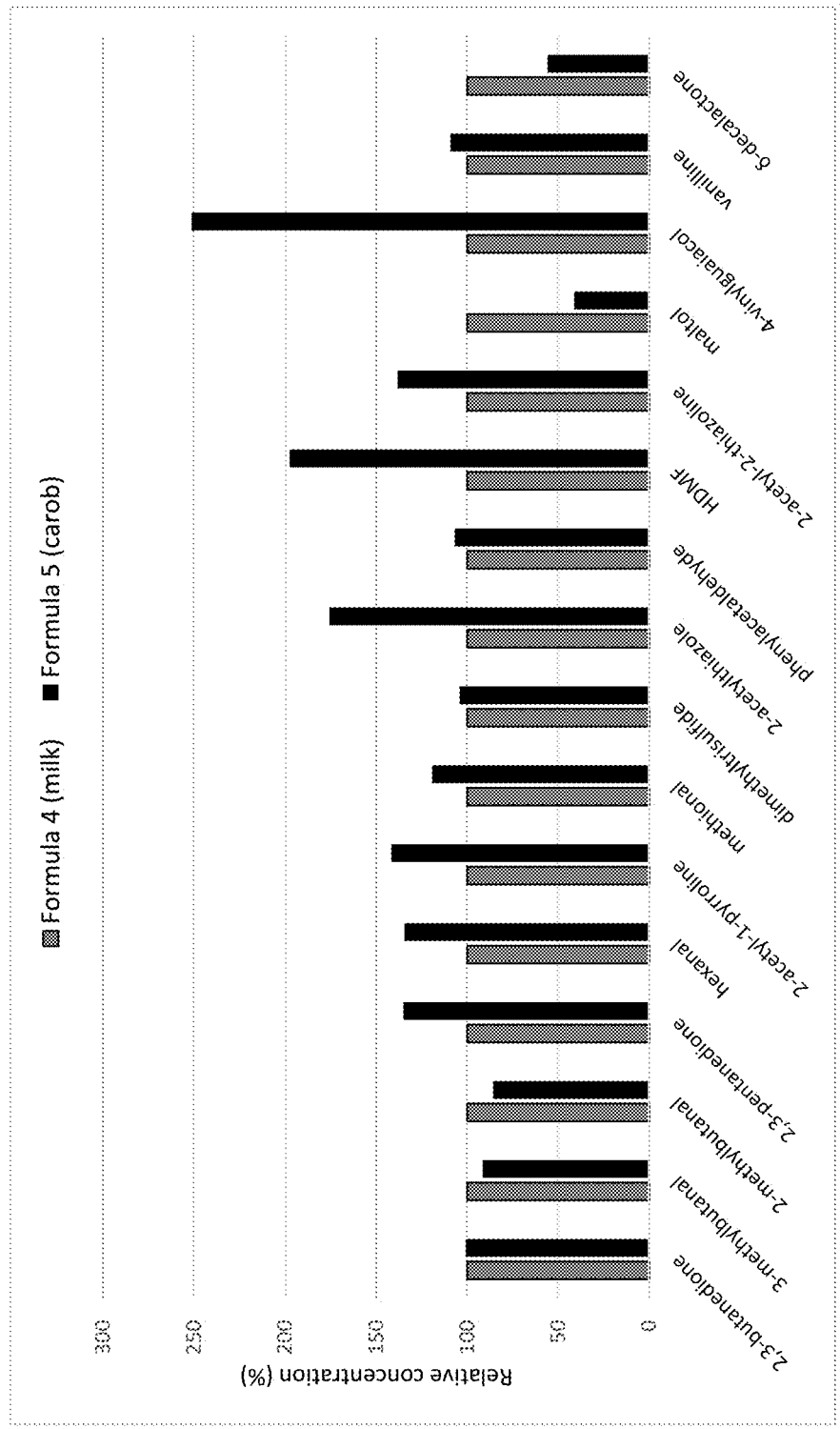
FIG. 5 is a graphical representation of relative concentrations of odorants in the product of Formula 5 (containing carob seed flour) as compared to the concentration of odorants present in the product of Formula 4 (which contains only skimmed milk powder; set as 100%).

In order to evaluate the impact of the formula on the aroma profile, the content of selected key aroma compounds was quantified in two cereal-based products produced as described in Example 7. The results are reported in FIG. 5, which depicts relative concentration (%) of the odorants in the product containing carob seed flour (Formula 5) compared to the concentration of odorants in the product containing only milk powder (Formula 4)(set as 100%). The results showed that carob seed flour applied with the 'new' process technology resulted in higher amounts of several important odorants, such as (but not limited to) 2,3-pentadione (+35%, buttery), 2 acetyl-1-pyrroline (+42%, toasty), 2-acetylthiazole (+76%, toasty), HDMF (+98%, caramel), 2-acetyl-2-thiazoline (+38%, toasty), and 4-vinylguaiacol (+151%, clove-like), as compared to skimmed milk powder applied in the same way. These results substantiated the results of the sensory evaluation and demonstrated that, if applied by the process of the present disclosure, plant proteins deliver unique sensory profiles as compared to dairy protein.

In Summary, in the non-limiting Examples shown herein, mono-cylinder roller drying was used as the main processing step, and in the preparation of the thermally treated composition, a specifically developed reaction skid based on tubular heat exchanger was employed. The methods performed as disclosed herein: (i) delivered significantly improved organoleptic properties as compared to conventional methods; (ii) provided similar flavor and color as compared to manufacturing processes based on reduced roller speed (with increased drying time), yet without the drawbacks of these manufacturing processes (such as reduced line throughput and reduced reactive (nutritionally active) lysine); (iii) delivered substantially the same amounts of aroma compounds, even in sugar (sucrose)-reduced recipes (validated by replacement of up to 42% sugar with flour); and/or (iv) provided superior levels of certain odorants as compared to analogous commercial products (i.e., resulted in the creation of a unique aroma fingerprint). The methods disclosed herein allow for expansion of the use of plant protein into multiple food and beverage applications.

Thus, in accordance with the present disclosure, there have been provided compositions, kits, and devices, as well as methods of producing and using same, which fully satisfy the objectives and advantages set forth hereinabove. Although the present disclosure has been described in conjunction with the specific drawings, experimentation, results, and language set forth hereinabove, it is evident that many alternatives, modifications, and variations will be apparent to those skilled in the art. Accordingly, it is intended to embrace all such alternatives, modifications, and variations that fall within the spirit and broad scope of the present disclosure.

What is claimed is:

1. A method of producing a thermally treated composition, the method comprising:
   (a) forming a slurry comprising at least one plant protein source, the at least one plant protein source is selected from the group consisting of chickpeas, lentils, dry beans, faba beans, bambara beans, lupins, vetches, sunflower seeds, canola seeds, rapeseed, sesame seeds, golden linseed, almond, hemp seed, pumpkin seed, grapeseed, and combinations thereof, the slurry further comprising at least one bulking agent, at least one reducing sugar source, at least one fat source, at least one buffering agent, and water, and the only reducing sugar in the slurry is selected from the group consisting of fructose, glucose, xylose, tagatose, rhamnose, maltose, lactose, fucose, arabinose, galactose, and mixtures thereof; and
   (b) subjecting the slurry to a heat treatment at a temperature in a range of from about 100° C. to about 150° C. under a pressure in a range of from about 2 bars to about 7 bars for a period of time in a range of from about 5 minutes to about 20 minutes to produce the thermally treated composition; and
   wherein at least one of:
   (i) the thermally treated composition has at least one reduced undesirable flavor of the at least one plant protein source when compared to a composition produced in the absence of step (b), wherein the undesirable flavor is selected from the group consisting of beany, green, earthy, hay-like, fishy, metallic, fatty, rancid, bitter, and astringent; and
   (ii) the thermally treated composition has at least one increased desirable flavor exhibiting a distinct flavor note when compared to a composition produced in the absence of step (b), wherein the distinct flavor note is selected from the group consisting of caramel, toffee, cookie, toasty, and sweet.

2. The method of claim 1, wherein the thermally treated composition has an aroma fingerprint comprising:
   2,3-butanedione at a concentration of at least about 500 parts per billion (ppb);
   4-hydroxy-2,5-dimethyl-3(2H)-furanone (HDMF) at a concentration of at least about 8,000 ppb; and
   hexanal at a concentration of no more than about 500 ppb.

3. The method of claim 2, wherein the aroma fingerprint further comprises maltol at a concentration of at least about 1500 ppb.

4. The method of claim 1, wherein step (a) is performed at a temperature in a range of from about 60° C. to about 80° C.

5. The method of claim 1, wherein in step (b), the slurry is subjected to the temperature in a range of from about 110° C. to about 140° C. under the pressure in a range of from about 3 bars to about 6 bars.

6. The method of claim 1 further comprising:
   (c) cooling the slurry to a temperature less than or equal to about 80° C.

7. The method of claim 1, wherein the slurry formed in step (a) has a total solid content in a range of from about 65% to about 90%.

8. The method of claim 1, wherein at least one ingredient is present in the slurry formed in step (a) at the following concentrations:

the at least one plant protein source in a range of from about 5% to about 25% dry w/w of the slurry;

the at least one bulking agent in a range of from about 30% to about 70% dry w/w of the slurry;

the at least one reducing sugar source in a range of from about 0.5% to about 60% dry w/w of the slurry;

the at least one fat source in a range of from about 10% to about 30% dry w/w of the slurry;

the at least one buffering agent present in an amount to bring the pH of the slurry prepared in step (a) to between 6 and 8; and the water in a range of from about 10% to about 25% dry w/w of the slurry.

9. The method of claim 8 further comprising hydrolyzing the slurry prior to step (b), and wherein the slurry is hydrolyzed with at least one enzyme, wherein the at least one enzyme has amylolytic, proteolytic, cellulolytic, hemicellulolytic, pectinolytic, glucanase or feruloyl esterase activity.

10. The method of claim 1, wherein the thermally treated composition comprises at least one cereal-based ingredient.

11. A thermally treated composition produced by the method selected from the group consisting of those of any one of claims 1-9 and 10.

12. A process of preparing a heat treated food or beverage product using the thermally treated composition produced by the method of claim 1, wherein the process comprising:

combining the thermally treated composition with one or more additional ingredients to form a mixture; and subjecting the mixture to one or more additional processing steps to form the heat treated food or beverage product, wherein the one or more additional processing steps are selected from the group consisting of drying, roller drying, extrusion cooking, oven drying, spray drying, baking, retorting, toasting, cereal/fruit bar making, and combinations thereof.

13. The process of claim 12, wherein the thermally treated composition is present in an amount in a range of from about 3% to about 30% dry w/w of the heat treated food or beverage product.

14. The process of claim 12, wherein the one or more additional ingredients comprise at least one cereal-based ingredient and wherein the one or more additional processing steps comprise roller drying.

15. The process of claim 12, wherein the heat treated food or beverage product has an increased concentration of at least one odorant when compared to a food or beverage product produced in the absence of step (b), wherein the at least one odorant is selected from the group consisting of 2,3-butanedione, 4-hydroxy-2,5-dimethyl-3(2H)-furanone (HDMF), maltol, 4-vinylguaiacol, 2-acetylthiazole, 2-acetyl-2-thiazoline, and combinations thereof.

16. A heat treated food or beverage product produced by the process of claim 12.

17. A method of producing a heat treated food or beverage product, the method comprising:

(a) forming a slurry comprising at least one plant protein source, the at least one plant protein source is selected from the group consisting of chickpeas, lentils, dry beans, faba beans, bambara beans, lupins, vetches, sunflower seeds, canola seeds, rapeseed, sesame seeds, golden linseed, almond, hemp seed, pumpkin seed, grapeseed, and combinations thereof, the slurry further comprising at least one bulking agent, at least one reducing sugar source, at least one fat source, at least one buffering agent, and water, and the only reducing sugar in the slurry is selected from the group consisting of fructose, glucose, xylose, tagatose, rhamnose, maltose, lactose, fucose, arabinose, galactose, and mixtures thereof;

(b) subjecting the slurry to a heat treatment at a temperature in a range of from about 100° C. to about 150° C. under a pressure in a range of from about 2 bars to about 7 bars for a period of time in a range of from about 5 minutes to about 20 minutes to produce a thermally treated composition, and wherein at least one of:

(i) the thermally treated composition has a reduced undesirable flavor of the at least one plant protein source when compared to a composition produced in the absence of step (b), wherein the undesirable flavor is selected from the group consisting of beany, green, earthy, hay-like, fishy, metallic, fatty, rancid, bitter, and astringent; and (ii) the thermally treated composition has an increased desirable flavor exhibiting a distinct flavor note when compared to a composition produced in the absence of step (b), wherein the distinct flavor note is selected from the group consisting of caramel, toffee, cookie, toasty, and sweet;

(c) combining the thermally treated composition with one or more additional ingredients to form a mixture; and (d) subjecting the mixture to at least one additional processing step to form the heat treated food or beverage product, wherein the at least one additional processing step is selected from the group consisting of roller drying, extrusion cooking, drying, spray drying, baking, retorting, toasting, and combinations thereof.

18. The method of claim 1, wherein the at least one plant protein source is selected from the group consisting of carob seed, chickpea, red lentil, and combinations thereof.

19. The method of claim 17, wherein the at least one plant protein source is selected from the group consisting of carob seed, chickpea, red lentil, and combinations thereof.

* * * * *